(12) United States Patent
Beier et al.

(10) Patent No.: US 11,449,487 B1
(45) Date of Patent: Sep. 20, 2022

(54) EFFICIENT INDEXING OF COLUMNS WITH INAPPROPRIATE DATA TYPES IN RELATIONAL DATABASES

(71) Applicant: International Business Machines Corporation, Armonk, NY (US)

(72) Inventors: Felix Beier, Haigerloch (DE); Knut Stolze, Hummelshain (DE); Reinhold Geiselhart, Rottenburg-Ergenzingen (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/208,725

(22) Filed: Mar. 22, 2021

(51) Int. Cl.
| G06F 16/00 | (2019.01) |
| G06F 16/22 | (2019.01) |
| G06F 16/2453 | (2019.01) |
| G06F 11/34 | (2006.01) |
| G06F 16/21 | (2019.01) |

(52) U.S. Cl.
CPC ...... *G06F 16/2272* (2019.01); *G06F 11/3452* (2013.01); *G06F 16/212* (2019.01); *G06F 16/2282* (2019.01); *G06F 16/24542* (2019.01)

(58) Field of Classification Search
CPC .............. G06F 16/2272; G06F 16/2282; G06F 16/24542; G06F 16/212
USPC ................................................. 707/741, 638
See application file for complete search history.

(56) References Cited

U.S. PATENT DOCUMENTS

| 2010/0088315 | A1 | 4/2010 | Netz |
| 2016/0078100 | A1 | 3/2016 | Anderson |
| 2016/0117375 | A1* | 4/2016 | Antonopoulos ...... G06F 16/219 |
| | | | 707/638 |
| 2017/0017686 | A1 | 1/2017 | Feng |
| 2017/0262491 | A1 | 9/2017 | Brewster |
| 2018/0129708 | A1 | 5/2018 | Beavin |
| 2019/0102412 | A1 | 4/2019 | Macnicol |
| 2019/0114295 | A1 | 4/2019 | Cao |
| 2019/0197175 | A1* | 6/2019 | Purcell ................ G06F 16/2425 |
| 2020/0117736 | A9 | 4/2020 | Hammerschmidt |

OTHER PUBLICATIONS

Bertrand, Aaron, "Issue with UNION and columns with mismatched data types in SQL Server", Updated: May 7, 2018, 5 pages.
(Continued)

*Primary Examiner* — Chelcie L Daye
(74) *Attorney, Agent, or Firm* — Edward P. Li

(57) ABSTRACT

A computer-implemented method, a computer program product, and a computer system for detecting an inappropriate data type of a column in a database and building a physical access path over a correct data type. The computer system detects in a table a candidate column with a first data type that has a mismatching type definition, using database usage statistics. The computer system determines whether it is possible to build an additional index as an access path over values with a second data type. The computer system, in response to determining that it is possible to build the additional index, converts values in the candidate column to the values with the second data type. The computer system builds the additional index over the values with the second data type in the table. The computer system generates a query plan operator for the additional index.

17 Claims, 6 Drawing Sheets

(56) References Cited

OTHER PUBLICATIONS

Beier, et al., "Efficient Storage of Columns With Inappropriate Data Types in Relational Databases", U.S. Appl. No. 17/208,652, filed Mar. 22, 2021.
Beier, et al., "Providing Character Encoding", U.S. Appl. No. 17/024,108, filed Sep. 17, 2020.
List of IBM Patents or Patent Applications Treated as Related. Filed Herewith. 2 pages.
Mell, et al., "The NIST Definition of Cloud Computing", National Institute of Standards and Technology, Special Publication 800-145, Sep. 2011, 7 pages.

* cited by examiner

EFFICIENT INDEXING OF COLUMNS WITH INAPPROPRIATE DATA TYPES IN RELATIONAL DATABASES

BACKGROUND

The present invention relates generally to a database management system, and more particularly to automatically detecting an inappropriate data type of a column in a database and building a physical access path over a correct data type.

In many customer installations of relational database management systems, some columns may have been declared with an inappropriate data type, e.g., storing numeric values as character strings. Reasons for declaring with an inappropriate data type may be manifold; for example, data modeling is erroneous for the application, the data model is changed while a system is operated, or columns are generated by data modeling and analysis tools. Such inappropriate column types lead to inefficiencies in the database system. An inappropriate encoding may require more space for storing column values of all rows. An inappropriate column type may lead to inefficient query evaluation; for example, implementing predicate evaluation operators for numeric columns is much more efficient than comparing lengthy character strings or performing conversion operations before evaluating column values.

SUMMARY

In one aspect, a computer-implemented method for detecting an inappropriate data type of a column in a database and building a physical access path over a correct data type is provided. The computer-implemented method includes detecting in a table a candidate column with a first data type that has a mismatching type definition, using database usage statistics. The computer-implemented method further includes determining whether it is possible to build an additional index as an access path over values with a second data type. The computer-implemented method further includes, in response to determining that it is possible to build the additional index, converting values in the candidate column to the values with the second data type. The computer-implemented method further includes building the additional index over the values with the second data type in the table. The computer-implemented method further includes generating a query plan operator for the additional index.

In another aspect, a computer program product for detecting an inappropriate data type of a column in a database and building a physical access path over a correct data type is provided. The computer program product comprises a computer readable storage medium having program instructions embodied therewith, and the program instructions are executable by one or more processors. The program instructions are executable to: detect in a table a candidate column with a first data type that has a mismatching type definition, using database usage statistics; determine whether it is possible to build an additional index as an access path over values with a second data type; in response to determining that it is possible to build the additional index, convert values in the candidate column to values with the second data type; build the additional index over the values with the second data type in the table; and generate a query plan operator for the additional index.

In yet another aspect, a computer system for detecting an inappropriate data type of a column in a database and building a physical access path over a correct data type is provided. The computer system comprises one or more processors, one or more computer readable tangible storage devices, and program instructions stored on at least one of the one or more computer readable tangible storage devices for execution by at least one of the one or more processors. The program instructions are executable to detect in a table a candidate column with a first data type that has a mismatching type definition, using database usage statistics. The program instructions are further executable to determine whether it is possible to build an additional index as an access path over values with a second data type. The program instructions are further executable to, in response to determining that it is possible to build the additional index, convert values in the candidate column to the values with the second data type. The program instructions are further executable to build the additional index over the values with the second data type in the table. The program instructions are further executable to generate a query plan operator for the additional index.

DETAILED DESCRIPTION

Figure 1:
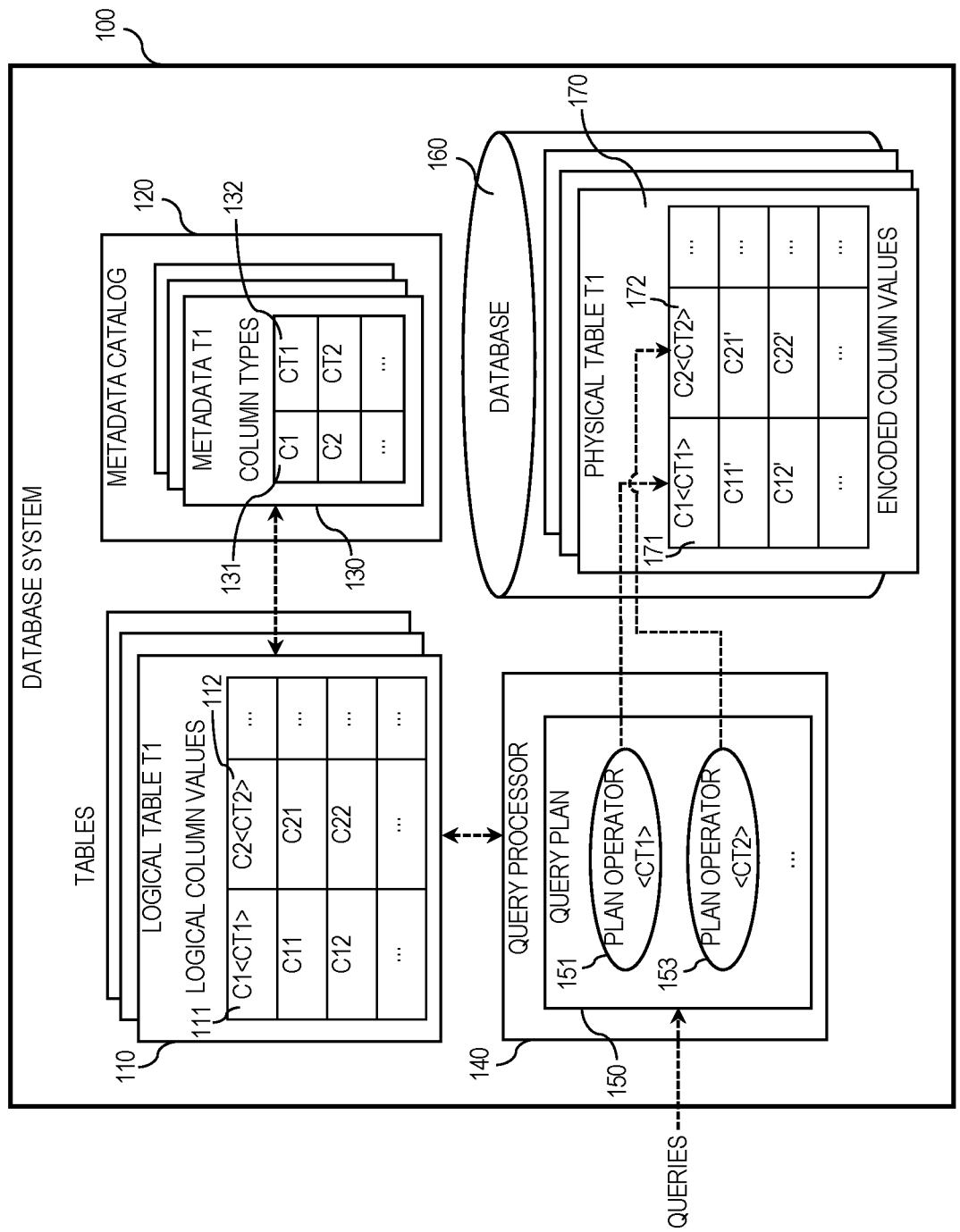
FIG. 1 is a diagram illustrating a database system, in accordance with an example of current technology.

FIG. 1 is a diagram illustrating database system 100, in accordance with an example of current technology. Database system 100 includes logical tables one of which is shown in FIG. 1 as logical table T1 110. Logical table T1 110 includes columns; for the purpose of illustration, FIG. 1 shows two columns: column C1<CT1> 111 and column C2<CT2> 112. Column C1<CT1> 111 has a data type of CT1 and include logical column values of C11, C12, and so on. Column C2<CT2> 112 has a data type of CT2 and include logical column values of C21, C22, and so on.

Database system 100 further includes metadata catalog 120. Metadata catalog 120 includes pieces of metadata corresponding to respective ones of the logical tables. For the purpose of illustration, FIG. 1 shows metadata T1 130 which is corresponding to logical table T1 110. In column 131, metadata T1 130 lists columns C1, C2, and so on in logical table T1 110; in column 132, metadata T1 130 lists data types CT1, CT2, and so on corresponding to C1, C2, and so on, respectively.

Database system 100 further includes database 160. On database 160, physical tables are included. For the purpose of illustration, FIG. 1 shows physical table T1 170 which is corresponding to logical table T1 110 and shows two columns: column C1<CT1> 171 and column C2<CT2> 172 corresponding to column C1<CT1> 111 and column C2<CT2> 112 in logical table T1 110, respectively. Column C1<CT1> 171 has a data type of CT1 and includes encoded column values of C11', C12', and so on. Column C2<CT2> 172 has a data type of CT2 and includes encoded column values of C21', C22', and so on.

Database system 100 further includes query processor 140. Query processor 140 receives queries to columns in logical tables including logical table T1 110. Query processor 140 compiles query plan operators. For the purpose of illustration, FIG. 1 shows two query plan operators: plan operator <CT1> 151 and plan operator <CT2> 153. Plan operator <CT1> 151 is compiled for a query for column C1<CT1> 171 in physical table 170, and plan operator <CT2> 153 is compiled for a query for column C2<CT2> 172 in physical table 170.

In database system 100 shown in FIG. 1, a column may have been declared with an inappropriate data type, and such inappropriate data type in the column may lead to inefficient query evaluation. The inefficiency may be avoided if the inappropriate data type is automatically detected and gracefully handled by a database management system. However, simply replacing the column with another column of a matching data type may not be an option if it may cause existing applications to break, because a query for the column assumes an original data type and a query operations that support the original data type.

Embodiments of the present invention disclose an approach of automatically detecting whether a column is using a correct data type within a database, building a physical access path over a correct data type, and correcting an access path to the column if needed. The main idea of the present invention is to gather usage statistics by a query processor. The query text, for example SQL (Structured Query Language), is assuming that a logical data model is defined when database tables are created. This data logical model is not changed by the present invention, because existing applications creating queries rely on the data logical model and should not be impacted.

Figure 2:
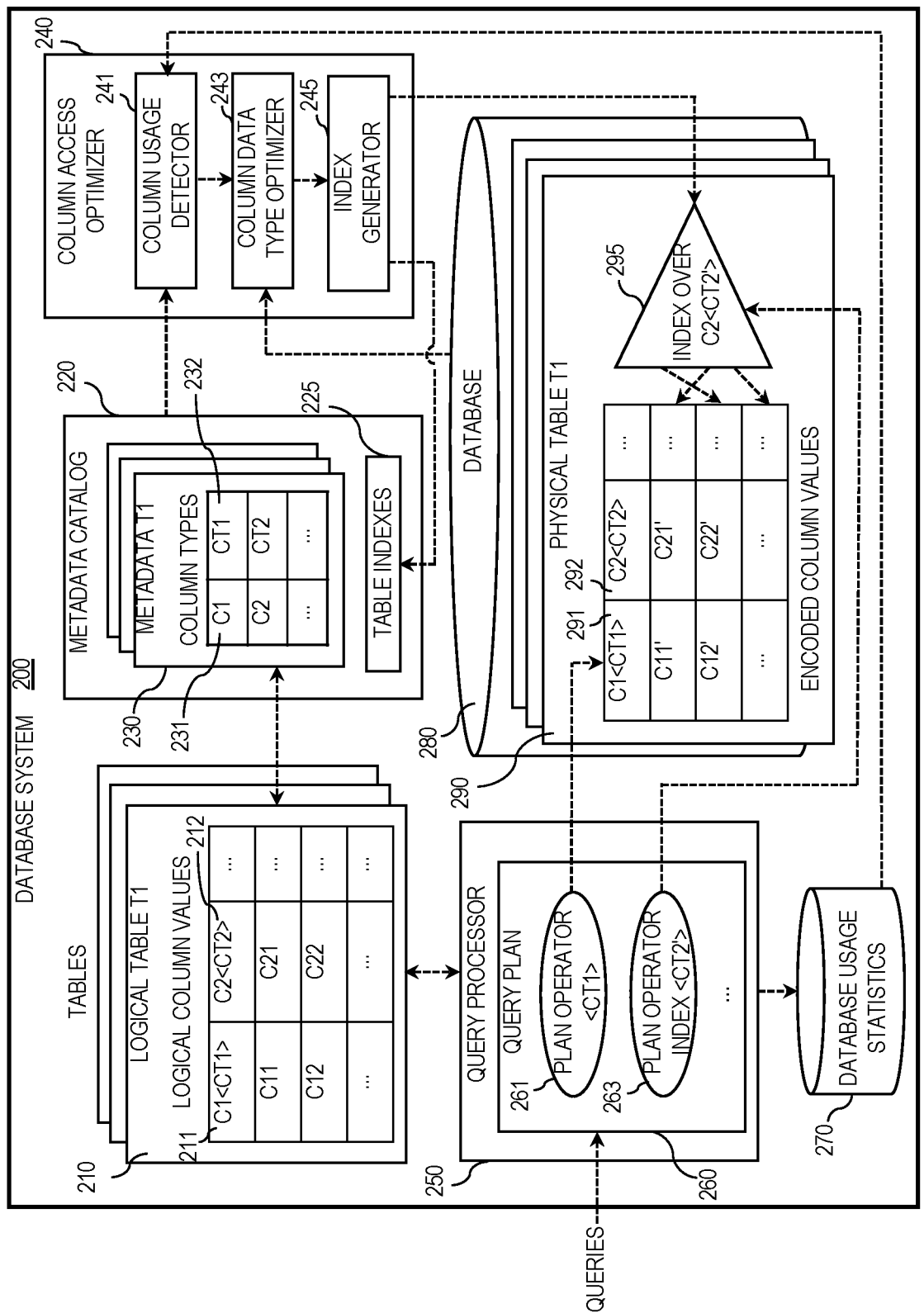
FIG. 2 is a diagram illustrating a database system of automatically detecting an inappropriate data type of a column in a database and building a physical access path over a correct data type, in accordance with one embodiment of the present invention.

FIG. 2 is a diagram illustrating database system 200 of automatically detecting an inappropriate data type of a column in a database and building a physical access path over a correct data type, in accordance with one embodiment of the present invention. Similar to database system 100 shown in FIG. 1, database system 200 includes logical tables including logical table T1 210. Logical table T1 210 includes column C1<CT1> 211 and column C2<CT2> 212. Column C1<CT1> 211 has a data type of CT1 and include logical column values of C11, C12, and so on, and column C2<CT2> 212 has a data type of CT2 and include logical column values of C21, C22, and so on.

Similar to database system 100 shown in FIG. 1, database system 200 includes metadata catalog 220. Metadata catalog 220 includes metadata T1 230 which is corresponding to logical table T1 210. In column 231, columns C1, C2, and so on are listed; in column 232, data types CT1, CT2, and so on are also listed. Different from database system 100, metadata T1 230 further includes table indexes 225. Table indexes 225 will be further discussed in later paragraphs of this document.

Different from database system 100 shown in FIG. 1, database system 200 includes column access optimizer 240. Column access optimizer 240 comprises three components: column usage detector 241, column data type optimizer 243, and index generator 245. Column access optimizer 240 and its components will be further discussed in later paragraphs of this document. Different from database system 100 shown in FIG. 1, database system 200 further includes database usage statistics 270. Database usage statistics 270 will be further discussed in later paragraphs of this document.

Similar to database system 100 shown in FIG. 1, database system 200 includes database 280. As shown in FIG. 2, on database 280, physical table T1 290 is included and it is corresponding to logical table T1 210. Similar to database system 100 shown in FIG. 1, physical table T1 290 includes column C1<CT1> 291 and column C2<CT2> 292 which are corresponding to column C1<CT1> 211 and column C2<CT2> 212 in logical table T1 210, respectively. Furthermore, similar to database system 100 shown in FIG. 1, column C1<CT1> 291 has a data type of CT1 and includes encoded column values of C11', C12', and so on; column C2<CT2> 292 has a data type of CT2 and includes encoded column values of C21', C22', and so on. As shown in FIG. 2, physical table T1 290 further includes index over C2<CT2'> 295 which is an additional index as an access path over column values with a new data type CT2'. Index over C2<CT2'> 295 is a new index additional to one or more original indexes that have been in the database system. The one or more original indexes use one or more original column types. An index may be built over multiple columns, i.e., combinations of the values are considered when searching entries inside the table. Such a multi-attribute index may be considered in building the additional index (index over C2<CT2'> 295).

Similar to database system 100 shown in FIG. 1, database system 200 includes query processor 250. Query processor 250 receives queries for columns in logical tables including logical table T1 210. Query processor 250 compiles query plan operators. Similar to database system 100, plan operator <CT1> 261 is compiled for processing a query for column C1<CT1> 291 in physical table T1 290. Different from database system 100 shown in FIG. 1, query processor 250 compiles an additional plan operator—plan operator index <CT2'> 263—for index over C2<CT2'> 295 as an access path over column values which has the new data type of CT2'.

When query processor 250 compiles a query access plan, query processor 250 tracks how columns are accessed and generates database usage statistics 270. Query processor 250 accesses the underlying columns and determines whether conversions operators are generated by a query optimizer. For example, the assessments are via histograms. Query processor 250 determines which logical operator versions are directly applied on the columns. The logical operator versions may include but not limited to filter predicates, sort operators, grouping operations, and aggregate functions. The filter predicates may include but not limited to point predicates (equality, inequality checks) and range predicates (greater than, less than, within, . . . , etc.). Query processor 250 may further determines how many times conversion operators are injected before applying one of above-mentioned the operators. For example, the conversions may include but not limited to character to numeric, character to date, character to time stamp, and numeric to numeric with different precision. Query processor 250 may further estimate execution costs for these above-mentioned operators.

Database usage statistics 270 is then evaluated by column access optimizer 240. Column usage detector 241 analyzes database usage statistics 270 to detect high-cost operators and determines alternative data types for columns. The alternative data types allow executing more cost-efficient operator versions; for example, range predicate filters may be executed more efficiently on an integer column than on a character column, and sorting an integer column may be implemented more efficiently than sorting a character column.

Column usage detector 241 analyzes database usage statistics 270 to detect high-cost conversion operations from an actual data type to a target data type that is used for evaluating predicates. Column usage detector 241 calculates a penalty metric. Column usage detector 241 calculates the penalty metric through multiplying an execution cost difference between the operator versions by the number of queries requiring the operators. Column usage detector 241 returns a list of candidate columns that have mismatching type definitions and their execution costs exceed a threshold. The operator alternatives may be modeled as static graph-based data structure that is traversed using a column's data type from metadata catalog 220 as a starting point.

For a candidate column (e.g., column C2<CT2> 292) in the list of the candidate columns, column data type optimizer 243 samples physical table T1 290 and tries to perform data conversion from a current data type (e.g., CT2) to a target data type (e.g., CT2'). Column data type optimizer 243 may remove a candidate column from the list of candidate columns if a conversion fails by a certain percentage of column values.

Column data type optimizer 243 determines whether building index over C2<CT2'> 295 as the access path over column values which has the new data type of CT2' is possible (e.g., column values may be represented as a more efficient new type). In response to determining that building index over C2<CT2'> 295 is possible, column data type optimizer 243 converts each value of the candidate column (e.g., column C2<CT2> 292) from the current data type (e.g., CT2) to a target data type (e.g., CT2'). Further, index generator 245 in column access optimizer 240 builds index over C2<CT2'> 295 (e.g., a hash-based or tree-based index) as the access path over the converted values, by inserting converted attributes into an index data structure. Index generator 245 registers index over C2<CT2'> 295 in table indexes 225 in metadata catalog 220. Upon index over C2<CT2'> 295 is built, column access optimizer 240 drops the temporary column. In another embodiment, index generator 245 may create a temporary column and store the converted values in the temporary column; further, index generator 245 builds index over C2<CT2'> 295 as the access path over the converted values in the temporary column. The advantage is that indexes, usually, require less memory or storage compared to a full column that stores all values redundantly.

Figure 3:
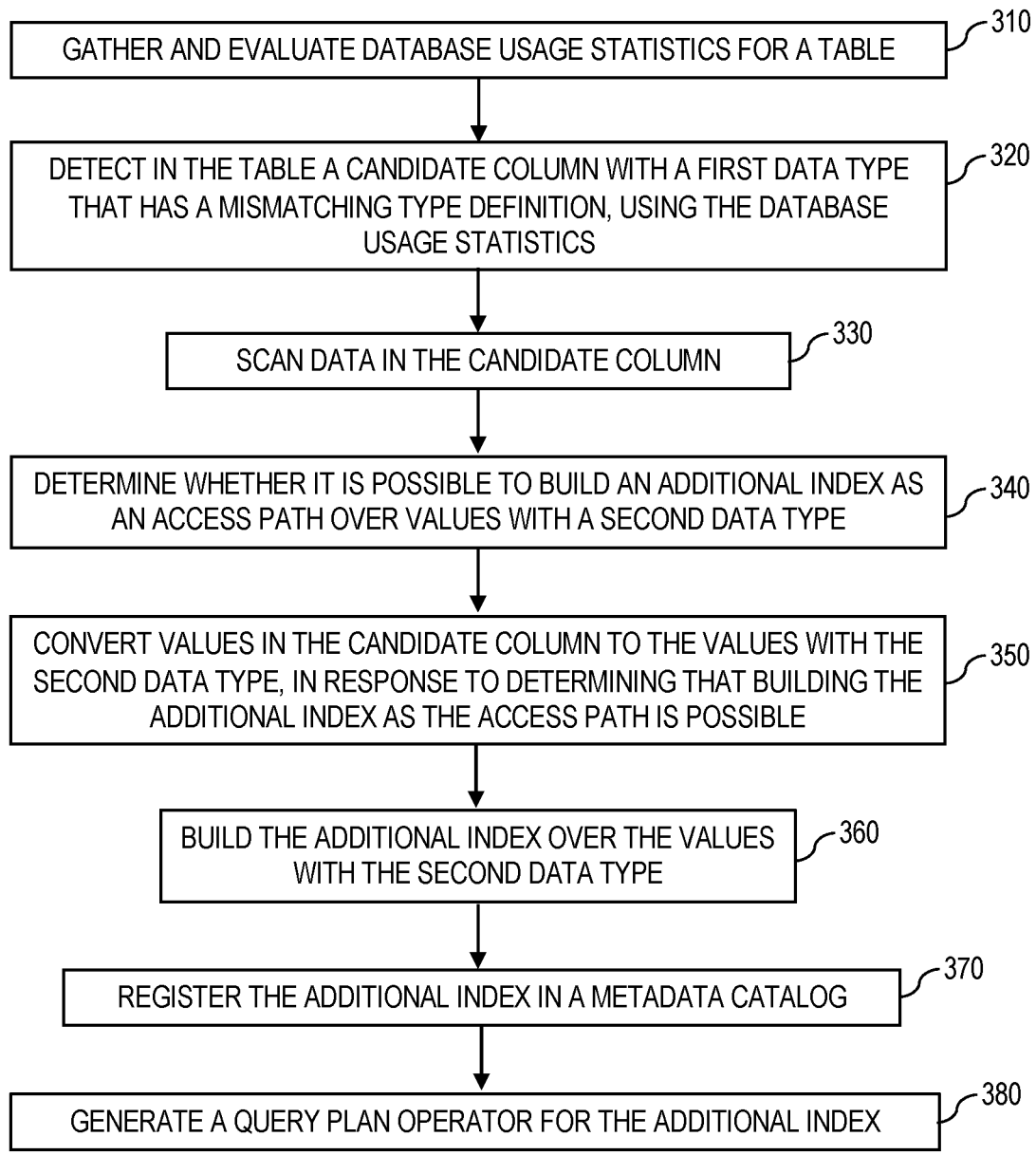
FIG. 3 presents a flowchart showing operational steps of automatically detecting an inappropriate data type of a column in a database and building a physical access path over a correct data type, in accordance with one embodiment of the present invention.

FIG. 3 presents a flowchart showing operational steps of automatically detecting an inappropriate data type of a column in a database and building a physical access path over a correct data type, in accordance with one embodiment of the present invention. The operational steps are implemented by a computing device or a server. A computing device or server is described in more detail in later paragraphs with reference to FIG. 4. In some embodiments, the operational steps may be implemented in a cloud computing environment. The cloud computing environment is described in later paragraphs with reference to FIG. 5 and FIG. 6.

At step 310, the computing device or server gathers and evaluates database usage statistics for a table. In the embodiment shown in FIG. 2, query processor 250 gathers data of database usage and generates database usage statistics 270, and column access optimizer 240 evaluates database usage statistics 270.

At step 320, the computing device or server detects in the table a candidate column with a first data type (or current data type) that has a mismatching type definition, using the database usage statistics. At this step, the computing device or server detects the candidate column where usage patterns indicate that the candidate column has the mismatching type definition. The computing device or server returns a list of candidate columns that have mismatching type definitions and their execution costs exceed a threshold. In the embodiment shown in FIG. 2, column usage detector 241 implements this step.

At step 330, the computing device or server scans data in the candidate column. At step 340, the computing device or server determines whether it is possible to build an additional index as an access path over values with a second data type. In the example shown in FIG. 2, column data type optimizer 243 scans data in candidate column C2<CT2> 292 in physical table T1 290 and determines whether it is possible to build index over C2<CT2'> 295 as an access path over values which have the new data type of CT2'.

At step 350, in response to determining that building the additional index as the access path is possible, the computing device or server converts values in the candidate column to the values with the second data type (or target data type). In the example shown in FIG. 2, column data type optimizer 243 converts each value of the candidate column (column C2<CT2> 292) from the current data type (e.g., CT2) to the target data type (e.g., CT2').

In another embodiment, at this step, the computing device or server creates a temporary column with the second data type and stores the converted column values in the temporary column in the table. In the example shown in FIG. 2, column data type optimizer 243 stores the converted values in the temporary column in physical table T1 290.

At step 360, the computing device or server builds the additional index over the values with the second data type. For example, the computing device or server builds a hash-based or tree-based index. In the example shown in FIG. 2, index generator 245 builds index over C2<CT2'> 295 in physical table T1 290 in database 280.

In another embodiment, in a case where the temporary column has been created, the computing device or server removes the temporary column in the table after the additional index is built at step 360.

At step 370, the computing device or server registers the additional index in a metadata catalog. In the example shown in FIG. 2, index generator 245 registers index over C2<CT2'> 295 in table indexes 225 of metadata T1 230 in metadata catalog 220.

At step 380, the computing device or server generates a query plan operator for the additional index. In the example shown in FIG. 2, query processor 250 generates plan operator index <CT2'> 263 for additional index over C2<CT2'> 295 in physical table T1 290.

Figure 4:
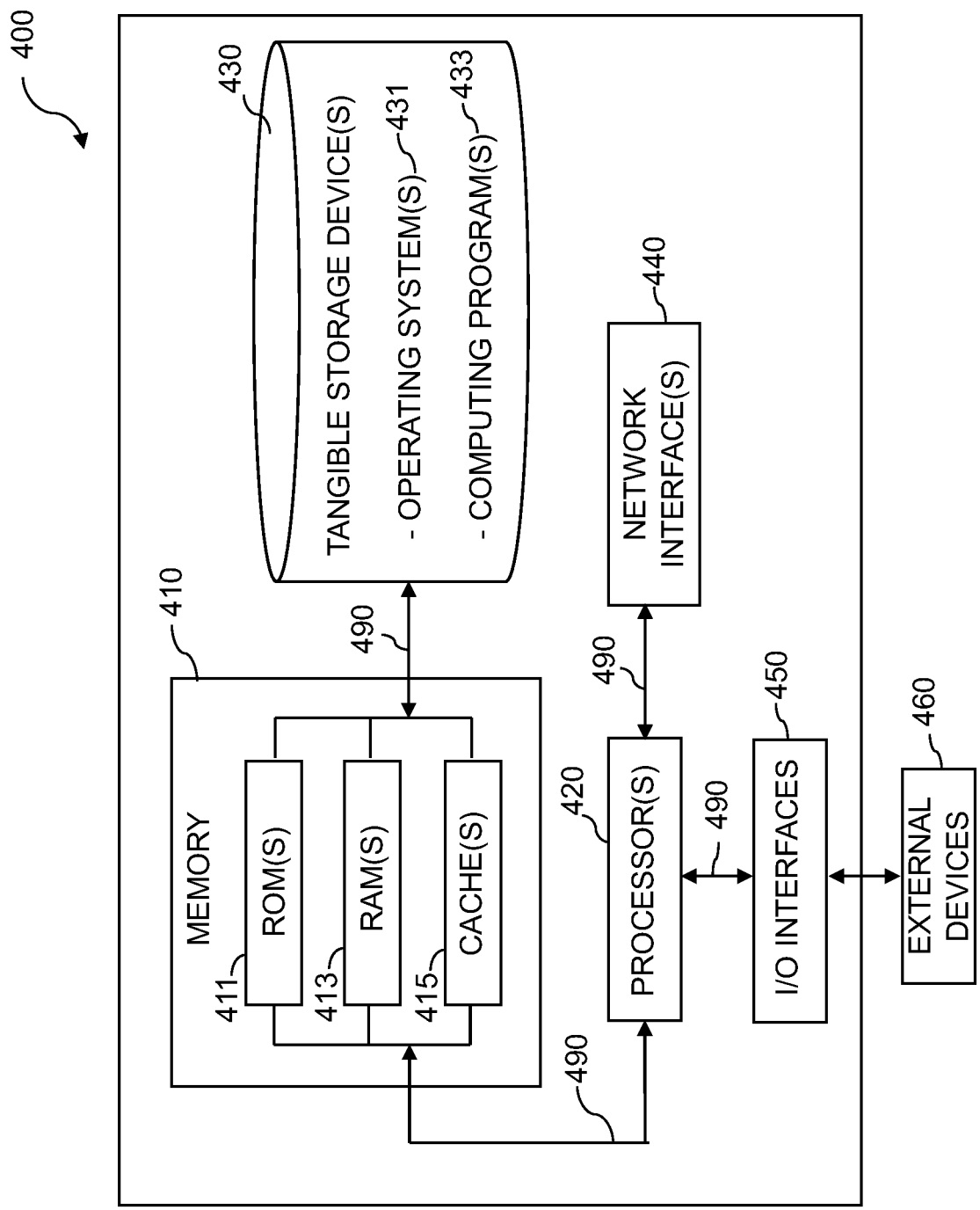
FIG. 4 is a diagram illustrating components of a computing device or server, in accordance with one embodiment of the present invention.

FIG. 4 is a diagram illustrating components of a computing device or server, in accordance with one embodiment of the present invention. It should be appreciated that FIG. 4 provides only an illustration of one implementation and does not imply any limitations with regard to the environment in which different embodiments may be implemented.

Referring to FIG. 4, computing device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
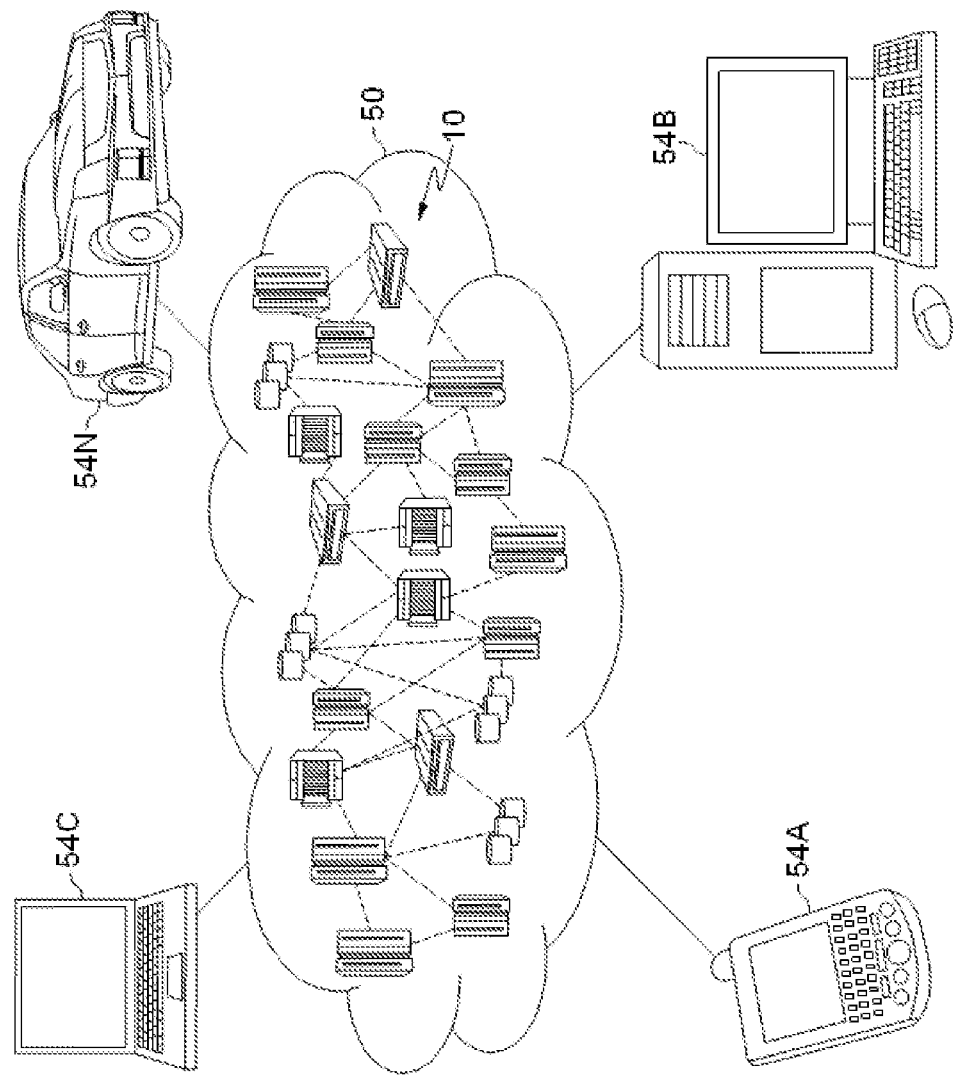
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
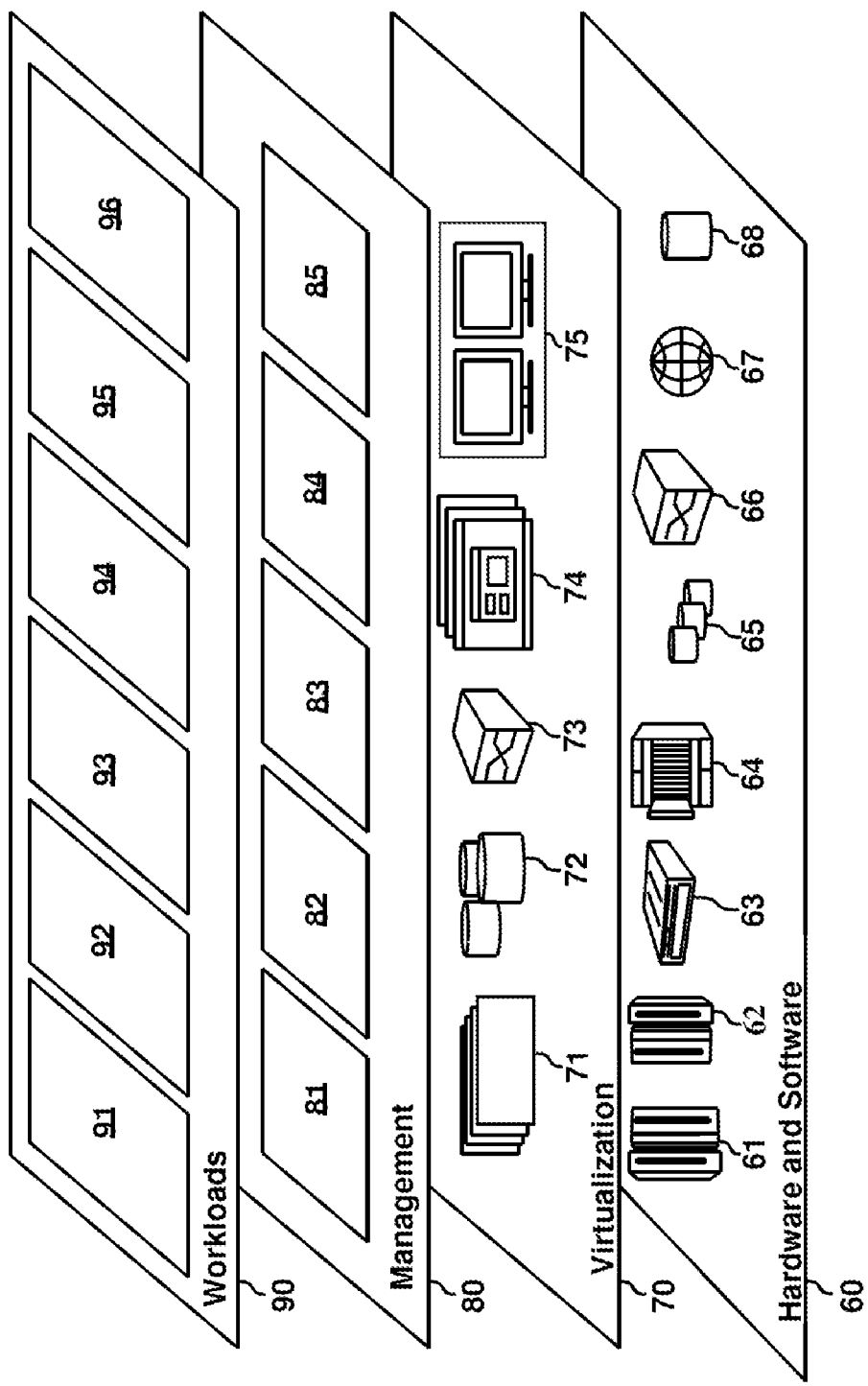
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of automatically detecting an inappropriate data type of a column in a database and building a physical access path over a correct data type.

What is claimed is:

1. A computer-implemented method for detecting an inappropriate data type of a column in a database and building a physical access path over a correct data type, the method comprising:
    analyzing database usage statistics of a table in the database to detect high-cost conversion operations;
    returning a list of candidate columns that have mismatching type definitions and have execution costs exceeding a predetermined threshold;
    scanning data in a candidate column with a first data type of values to determine whether it is possible to build an additional index as an access path over a second data type of values;
    in response to determining that it is possible to build the additional index, converting the first data type of values in the candidate column to the second data type of values in a temporary column in the table;
    inserting converted attributes into an index data structure, to build the additional index over the values with the second data type in the table;
    removing the temporary column after the additional index is built; and
    generating, in a query plan for the database, a query plan operator for the additional index, wherein the query plan operator for the additional index is a more cost-efficient operator.

2. The computer-implemented method of claim 1, further comprising:
    gathering and evaluating the database usage statistics for the table.

3. The computer-implemented method of claim 1, further comprising:
    creating the temporary column with the second data type in the table; and
    storing converted column values in the temporary column in the table.

4. The computer-implemented method of claim 1, further comprising:
    registering the additional index in a metadata catalog.

5. The computer-implemented method of claim 1, wherein the additional index is one of a hash-based and tree-based index.

6. The computer-implemented method of claim 1, further comprising:
    removing the candidate column from a list of candidate columns, in response to determining that conversion of the candidate column fails by a certain percentage of column values in the candidate column.

7. A computer program product for detecting an inappropriate data type of a column in a database and building a physical access path over a correct data type, the computer program product comprising a computer readable storage medium having program instructions embodied therewith, the program instructions executable by one or more processors, the program instructions executable to:
    using analyze database usage statistics of a table in the database to detect high-cost conversion operations;
    return a list of candidate columns that have mismatching type definitions and have execution costs exceeding a predetermined threshold;
    scan data in a candidate column with a first data type of values to determine whether it is possible to build an additional index as an access path over a second data type of values;
    in response to determining that it is possible to build the additional index, convert the first data type of values in the candidate column to the second data type of values in a temporary column in the table;
    insert converted attributes into an index data structure, to build the additional index over the values with the second data type in the table;
    remove the temporary column from the table after the additional index is built; and
    generate, in a query plan for the database, a query plan operator for the additional index, wherein the query plan operator for the additional index is a more cost-efficient operator.

8. The computer program product of claim 7, further comprising the program instructions executable to:
    gather and evaluate the database usage statistics for the table.

9. The computer program product of claim 7, further comprising the program instructions executable to:
    create the temporary column with the second data type in the table; and
    store converted column values in the temporary column in the table.

10. The computer program product of claim 7, further comprising the program instructions executable to:
    register the additional index in a metadata catalog.

11. The computer program product of claim 7, wherein the additional index is one of a hash-based and tree-based index.

12. The computer program product of claim 7, further comprising program instructions executable to:
remove the candidate column from a list of candidate columns, in response to determining that conversion of the candidate column fails by a certain percentage of column values in the candidate column.

13. A computer system for detecting an inappropriate data type of a column in a database and building a physical access path over a correct data type, the computer system comprising one or more processors, one or more computer readable tangible storage devices, and program instructions stored on at least one of the one or more computer readable tangible storage devices for execution by at least one of the one or more processors, the program instructions executable to:
analyze database usage statistics of a table in the database to detect high-cost conversion operations;
return a list of candidate columns that have mismatching type definitions and have execution costs exceeding a predetermined threshold;
scan data in a candidate column with a first data type of values to determine whether it is possible to build an additional index as an access path over a second data type of values;
in response to determining that it is possible to build the additional index, convert the first data type of values in the candidate column to the second data type of values in a temporary column in the table;
insert converted attributes into an index data structure, to build the additional index over the values with the second data type in the table;
remove the temporary column from the table after the additional index is built; and
generate, in a query plan for the database, a query plan operator for the additional index, wherein the query plan operator for the additional index is a more cost-efficient operator.

14. The computer system of claim 13, further comprising the program instructions executable to:
gather and evaluate the database usage statistics for the table.

15. The computer system of claim 13, further comprising the program instructions executable to:
create the temporary column with the second data type in the table; and
store converted column values in the temporary column in the table.

16. The computer system of claim 13, further comprising the program instructions executable to:
register the additional index in a metadata catalog.

17. The computer system of claim 13, further comprising program instructions executable to:
remove the candidate column from a list of candidate columns, in response to determining that conversion of the candidate column fails by a certain percentage of column values in the candidate column.

* * * * *